(12) United States Patent
Cole et al.

(10) Patent No.: US 6,816,636 B2
(45) Date of Patent: Nov. 9, 2004

(54) TUNABLE OPTICAL FILTER

(75) Inventors: Barrett E. Cole, Bloomington, MN (US); Subash Krishnankutty, Hamden, CT (US); Robert D. Horning, Savage, MN (US)

(73) Assignee: Honeywell International Inc., Morristown, NJ (US)

(*) Notice: Subject to any disclaimer, the term of this patent is extended or adjusted under 35 U.S.C. 154(b) by 153 days.

(21) Appl. No.: 09/953,506

(22) Filed: Sep. 12, 2001

(65) Prior Publication Data

US 2003/0048970 A1 Mar. 13, 2003

(51) Int. Cl.⁷ .............................. G02F 1/295
(52) U.S. Cl. .................. 385/10; 359/578; 359/228; 349/198
(58) Field of Search ............... 359/892, 230, 359/223, 224, 260, 578, 228; 385/10; 356/454; 349/198

(56) References Cited

U.S. PATENT DOCUMENTS

| | | | |
|---|---|---|---|
| 5,408,319 A | 4/1995 | Halbout et al. | |
| 5,418,868 A | 5/1995 | Cohen et al. | 385/16 |
| 5,450,053 A | 9/1995 | Wood | |
| 5,550,373 A | 8/1996 | Cole et al. | |
| 5,915,051 A | 6/1999 | Damask et al. | 385/16 |
| 5,933,565 A * | 8/1999 | Diebold | 385/147 |
| 6,115,122 A | 9/2000 | Bao et al. | 356/345 |
| 6,122,416 A | 9/2000 | Ooba et al. | 385/16 |
| 6,545,739 B1 * | 4/2003 | Matsumoto et al. | 349/198 |
| 6,594,059 B2 * | 7/2003 | Flanders | 359/230 |
| 2002/0191268 A1 * | 12/2002 | Seeser et al. | 359/260 |

FOREIGN PATENT DOCUMENTS

| | | |
|---|---|---|
| DE | 3311808 A1 | 10/1984 |
| EP | 0667548 A1 | 8/1995 |
| EP | 1061618 A2 | 12/2000 |
| EP | 1069658 A1 | 1/2001 |
| WO | WO 99/42875 | 8/1999 |

OTHER PUBLICATIONS

Bill Schweber, "An Old Communications Problem Reoccurs in Optical–Communication–System Design—How it Works: Making the Laser Diode Tunable", *EDN*, Sep. 28, 2000, pp. 44–48, (www.ednmag.com).

A.M. Ferber et al., "A Miniature Silicon Photoacoustic Detector for Gas Monitoring Applications", presented at the MTEX 2001 International Conference on Sensors and Transducers, Birmingham, UK, Feb. 14, 2001, 7 pages.

Ralph W. Bernstein et al., "Development of a Miniature Silicon PhotoAcoustic Gas Sensor", Presented at Opto 96, Leipzig, Germany, Sep. 26–29, 1999, 6 pages.

* cited by examiner

*Primary Examiner*—Toan Ton
*Assistant Examiner*—Richard H Kim
(74) *Attorney, Agent, or Firm*—Kris T. Fredrick

(57) ABSTRACT

A tunable filter having a top mirror, a bottom mirror, and one or more intervening layers. The one or more intervening layers preferably have a refractive index that changes with temperature. By heating the one or more intervening layers, the wavelength that is selected by the optical filter can be controlled. The one or more intervening layers are preferably heated by passing current through the one or more intervening layers, or by passing current through a separate resistive layer that is thermally coupled to the one or more intervening layers. Such a filter can provide a high degree of wavelength selectivity in a robust and stable manner.

25 Claims, 11 Drawing Sheets

TUNABLE OPTICAL FILTER

FIELD OF THE INVENTION

The present invention generally relates to optical filters, and more particularly to wavelength-selective optical filters.

BACKGROUND OF THE INVENTION

The increased use of all-optical fiber networks as backbones for global communication systems has been based in large part on the extremely wide optical transmission bandwidth provided by optical fiber. This has led to an increased demand for the practical utilization of the full optical fiber bandwidth available, to, for example, increase communication system user capacity. In the prevailing manner for exploiting optical fiber bandwidth, wavelength-division multiplexing (WDM) and wavelength-division demultiplexing (WDD) techniques are used to enable the simultaneous transmission of multiple independent optical data streams, each of a distinct wavelength, on a single optical fiber, with wavelength-selective WDM and WDD control provided for coupling of the multiple data streams with the optical fiber on a wavelength-specific basis. With this capability, a single optical fiber can be configured to simultaneously transmit several optical data streams, e.g., ten optical data streams, that each might not exceed, say, 10 Gb/s, but that together represent an aggregate optical fiber transmission bandwidth of more than, say, 100 Gb/s.

In order to increase the aggregate transmission bandwidth of an optical fiber, it is generally preferred that the spacing of simultaneously transmitted optical data streams, or optical data "channels," be closely packed, to accommodate a larger number of channels. In other words, the difference in wavelength between two adjacent channels is preferably minimized. This desire for closely-spaced optical transmission channels results in the need for fine wavelength resolution and thereby complicates the wavelength-selective WDM and WDD operations required for simultaneous transmission of the channels.

There are a number of optical devices presently available for constructing wavelength-selective WDM and WDD systems. Some of these devices include, for example, thin film filters that reflects a very narrow band of wavelengths. Such filters are often constructed from several hundred layers of stacked narrow band filters, and are designed to reflect a single narrow band of wavelengths. Arrayed waveguide gratings are also available. A limitation of many of these devices is that they are not wavelength tunable. That is, the operative wavelength cannot be dynamically changed during operation in order to select a different optical data channel during use. This can have negative implications for many wavelength-selective WDM, WDD and routing applications.

To overcome these limitations, a number of devices have been developed to provide some level of wavelength tunability. Many of these devices, however, require some form of physical motion or movement to achieve the desired tunability. For example, one such device includes a substrate with a diffraction grating. The diffraction grating is provided in the path of an incoming light beam. To provide wavelength tunability, the diffraction grating is rotated, which causes the incoming light beam to strike the diffraction grating at a different incident angle. The change in incident angle alters the selected wavelength of the grating. In another example, a Fabry-Perot cavity is provided with two mirrors separated by an intervening space. The mirrors are moved either toward or away from each other to vary the intervening space, which changes the selected wavelength of the Fabry-Perot cavity. A limitation of many of these devices is that the required physical movement tends to limit the resolution that can be achieved, and may reduce the reliability and/or stability of such devices. These limitations generally characterize the insufficiency of conventional all-optical wavelength-selective techniques in meeting the increasingly complex requirements of optical systems.

SUMMARY OF THE INVENTION

The present invention overcomes many of the disadvantages of the prior art by providing a tunable optical filter that has no moving parts. In one illustrative embodiment, a Fabry-Perot cavity structure is provided that has a top mirror spaced from a bottom mirror, with one or more intervening layers therebetween. The one or more intervening layer preferably has a refractive index that changes with temperature. By heating the one or more intervening layer, the wavelength selected by the Fabry-Perot cavity can be controlled, which provides the desired wavelength tunability or selectivity of the optical filter. The one or more intervening layer is preferably heated by passing a current through the intervening layer, or by passing a current through a separate resistive layer that is thermally coupled to the one or more intervening layer. It has been found that such a filter can provide a high degree of wavelength selectivity in a robust and stable manner.

To reduce the power required to heat the one or more intervening layer, steps may be taken to thermally isolate the one or more intervening layer from its surroundings. In one illustrative embodiment, the one or more intervening layer is mechanically suspended in a cavity by a patterned support layer. The patterned support layer preferably has a low coefficient of thermal conductivity, and may be patterned to have a relatively small lateral cross sectional area. Both of these reduce the amount of heat lost laterally through the device. To reduce the thermal loss due to convection and/or conduction heating, the device may be mounted in a vacuum package, if desired.

A controller is preferably provided for controlling the current that is applied to heat the one or more intervening layer. The controller may be an open loop controller, which provides a specific amount of current or power to select a desired wavelength. Alternatively, the controller may be a closed loop controller, which uses a temperature sensor to provide feedback to the controller so that a desired temperature can be maintained at the layer of intervening material.

A number of methods for making a tunable filter are also contemplated. In one illustrative method, a substrate is first provided. A heater film is then provided adjacent the substrate, such that the heater film is thermally coupled to at least a portion of a predefined filter region of the substrate. A support film is also provided, such that the support film is mechanically coupled to the filter region and to a support region of the substrate. The support region preferably is spaced from and encircles the filter region, but this is not necessary. An upper multi-layer mirror is preferably provided adjacent at least a portion of the filter region. With the upper multi-layer mirror protected preferably using a protective layer, the substrate around the periphery of the filter region is selectively removed, leaving a space between the support region of the substrate and the filter region of the substrate. A lower multi-layer mirror may then be provided below the filter region.

In one illustrative embodiment, a Silicon-On-Insulator (SOI) substrate is used. The SOI substrate has a lower silicon layer, an intermediate insulating layer, and an upper silicon layer. In this embodiment, the filter region is preferably formed in the upper silicon layer, and the lower silicon layer is removed below the filter region. The intermediate insulating layer can be used as an etch stop when removing the lower silicon layer. The intermediate insulating layer can also be removed, or left in position to provide additional support to the filter region if desired. By removing the lower silicon layer below the filter region, the thermal mass of the filter region may be minimized. This reduces the power required to heat the layer of intervening material in the filter region. Once the lower silicon layer is removed, a lower multi-layer mirror can be provided adjacent the upper silicon layer in the filter region. In the above illustrative embodiments, the order of the steps may be changed without deviating from the scope of the present invention.

The tunable filter of the present invention may have a wide range of applications, including telecommunications applications such as WDM, WDD, and routing applications. In one example, the tunable filter of the present invention may be used in a signal drop application where a particular wavelength signal or "channel" is dropped from a multiple channel data stream. In this application, a multiple channel data stream is provided to the tunable filter. The tunable filter is heated such that the tunable filter passes a desired drop signal or channel to a first collector location, and reflects the remaining signals or channels to a second collector location.

To drop another signal or channel, a second tunable filter may be provided at the second collector location. Like above, the second tunable filter may be heated such that the tunable filter passes another desired drop signal or channel to a third collector location. The second tunable filter may reflect the remaining signals or channels to a fourth collector location. This may continue, dropping as many of the signals or channels from the multiple channel data stream as desired.

In a signal add application, where a particular wavelength signal or "channel" is to be added to a multiple channel data stream, the multiple channel data stream may be provided to a first side of the tunable filter. The signal or channel to be added is provided to the opposite side of the tunable filter. The tunable filter is heated such that the tunable filter passes the signal or channel to be added to a first collector location. The tunable filter also reflects the multiple channel data stream to the first collector location.

To add another signal or channel, a second tunable filter may be provided at the first collector location. The signals or channels that are present at the first collector location are provided to a first side of the second tunable filter. Another signal or channel to be added is provided to the opposite side of the second tunable filter. The second tunable filter is heated such that the tunable filter passes the second signal or channel to be added to a second collector location. The second tunable filter also preferably reflects the signals provided by the first tunable filter to the second collector location. This may continue to add as many signals or channels to the multiple channel data stream as desired.

Another illustrative application for the tunable filter of the present invention is to monitor the emission wavelength of a laser. It is known that the emission wavelength of a laser may drift over time, temperature, etc. To monitor the emission wavelength, the tunable filter of the present invention may be positioned between the laser and a detector. The detector preferably is capable of detecting a relatively wide range of wavelengths, while the tunable filter only passes a relatively narrow band of wavelengths. With the laser turned on, the tunable filter is heated until the filter passes the current operating wavelength of the laser to the detector. When the detector detects the emission, a controller is notified. By noting the heat applied to the tunable filter, the controller may determine the current operating wavelength of the laser.

Such a system may be used to, for example, control the wavelength of a laser. For example, if the current operating wavelength of the laser, as determined by the controller, is not within a predefined range of wavelengths, the controller may adjust the power that is applied to the laser to change the emission wavelength of the laser until it falls within the predefined range of wavelengths. It is contemplated that the laser emission may be directly applied to the tunable filter. Alternatively, only a portion of the laser emission may be applied to the tunable filter by using a beam splitter or the like.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
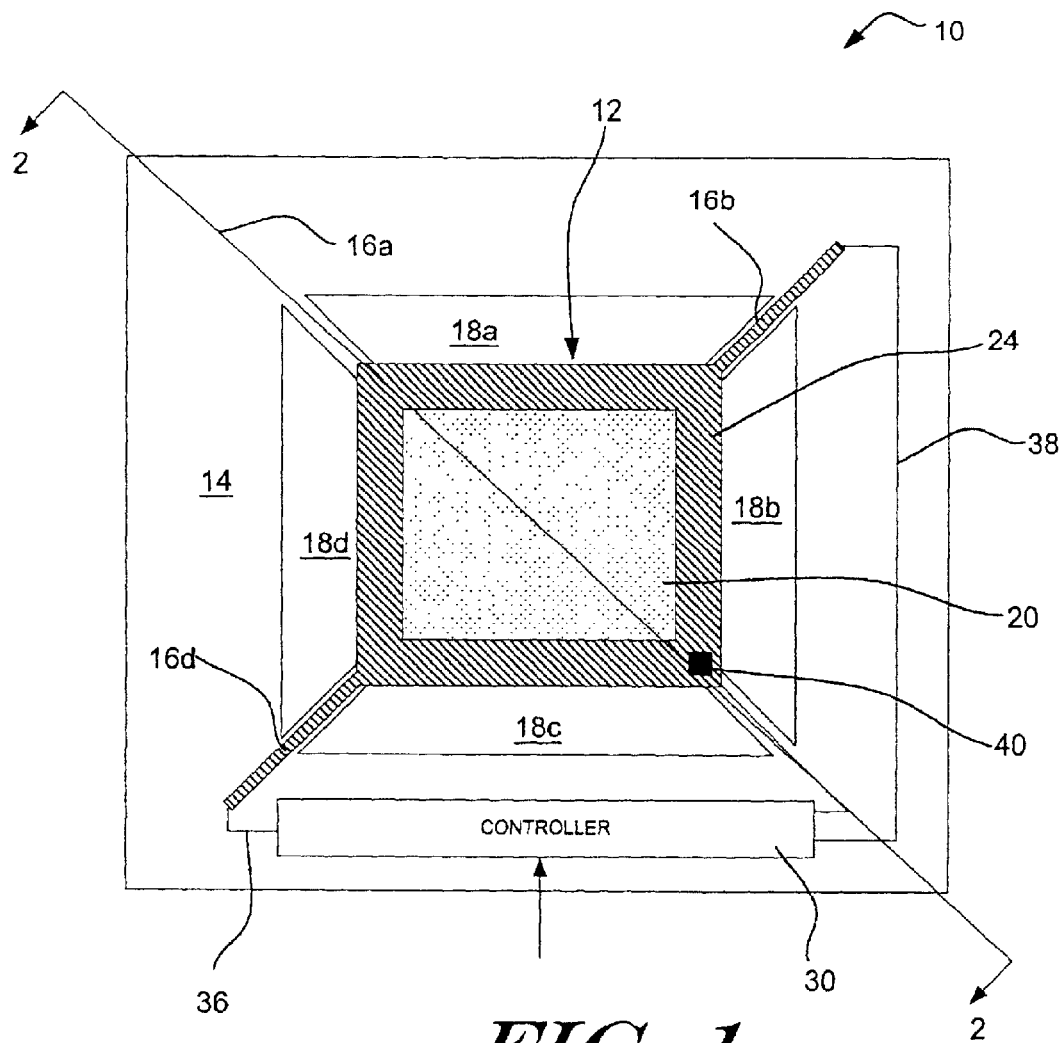
FIG. 1 is a plan view of an illustrative tunable optical filter in accordance with the present invention.

FIG. 1 is a plan view of an illustrative tunable optical filter 10 in accordance with the present invention. The illustrative tunable optical filter includes a filter region 12, a support body 14, and one or more support legs 16a–16d. The support legs 16a–16d preferably suspend the filter region 12 away from the support region 14. Thus, and as shown in FIG. 1, the filter region 12 is preferably spaced from the support body 14 by air gaps 18a–18d, which help thermally isolated the filter region from the support body 14.

The support legs 16a–16d are preferably formed from a material that has a low coefficient of thermal conductivity, such as $Si_3N_4$, Polyimide, or any other suitable material. Silicon and/or polycrystalline silicon are other example materials that can readily be used. The support legs 16a–16d may have a relatively small cross-sectional area, to even further reduce the thermal conduction between the filter region 12 and the support body 14.

The filter region 12 is preferably configured to pass a selected wavelength or band of wavelengths, and reflect all other wavelengths of interest. This may be accomplished by providing a Fabry-Perot cavity structure that has at least one layer with a refractive index that changes with temperature. In FIG. 1, the Fabry-Perot cavity structure has a first (e.g. top) mirror 20 spaced from a second (e.g. bottom) mirror 22 (see FIG. 2). By heating the Fabry-Perot cavity structure, the refractive index of the at least one layer may change, which changes the wavelength selected by the Fabry-Perot cavity. This provides the wavelength tunibility or selectivity for the illustrative optical filter of FIG. 1.

It is contemplated that the Fabry-Perot cavity structure can be heated in any suitable manner. One illustrative method is to pass a current through a resistive layer that is thermally coupled to the Fabry-Perot cavity structure. In the illustrative embodiment of FIG. 1, resistive layer 24 is provided under the first (e.g. top) mirror 20 in the filter region 12. The resistive layer 24 extends across support legs 16b and 16d, although this is not necessary. The resistive layer 24 may have a refractive index that changes with temperature, or alternatively, may be thermally coupled to a layer that has a refractive index that changes with temperature.

A controller 30 is preferably provided for controlling the current or power provided to the resistive layer 24 via lines 36 and 38. The controller 30 may be an open loop controller, which provides a specific amount of current or power to the resistive layer 24 to produce a desired temperature. The desired temperature is calibrated to select a desired wavelength. Alternatively, the controller 30 may be a closed loop controller, which may use a temperature sensor 40 to provide feedback to the controller 30 so that a desired temperature can be selected and maintained at the resistive layer 24. The selected temperature is calibrated to select a desired wavelength. Rather than using separate temperature sensor 40 as shown in FIG. 1, it is contemplated that the resistive layer 24 may be made from a material that has a resistance with a relatively high temperature coefficient. One illustrative material may be polycrystalline silicon. When so provided, the temperature of the resistive layer can be determined by monitoring the resistance of the resistor layer 24. Alternative, a separate layer having a resistance with a relatively high temperature coefficient may be provided in thermal communication with the resistive layer 24. Then, the temperature of the resistive layer 24 can be determined by monitoring the resistance of this other layer. Such a device may be included in a vacuum package to reduce the thermal loss due to convection and conduction heating, which may reduce the power consumed by the device.

Figure 2:
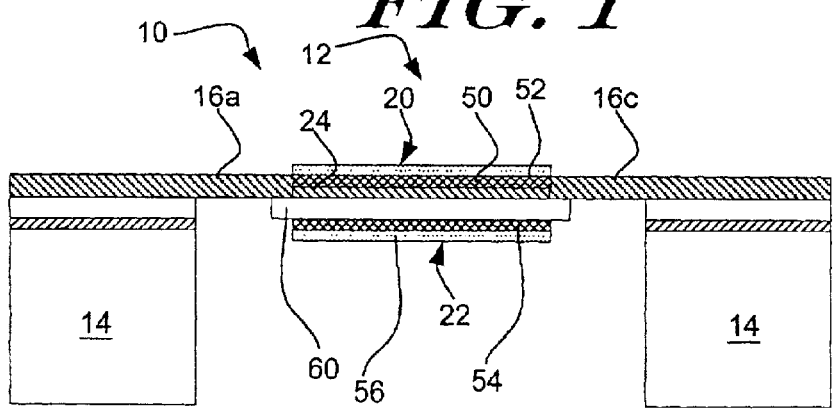
FIG. 2 is an illustrative cross-sectional side view of the tunable optical filter of FIG. 1, taken along line 2—2.

FIG. 2 is an illustrative cross-sectional side view of the tunable optical filter of FIG. 1, taken along line 2—2. The optional temperature sensor 40 is not shown for clarity. The tunable optical filter 10 includes a filter region generally shown at 12. The filter region includes a Fabry-Perot cavity structure with a top mirror 20 spaced from a bottom mirror 22. The top mirror 20 includes two or more mirror layers, such as mirror layers 50 and 52, to collectively form a reflector. The two or more mirror layers 50 and 52 may be any type of mirror layers that provide reflectivity at or near a desired wavelength spectrum. In a preferred embodiment, the mirror layers 50 and 52 are Silicon and Silicon Oxide, respectively, but may be any high or low index films, preferably with low infrared absorption. Other material systems may also be used, as desired. While only two mirror layers are shown in FIG. 2, more layers may be provided for increased wavelength discrimination.

Like the top mirror 20, the bottom mirror 22 may also include two or more mirror layers, such as mirror layers 54 and 56, to collectively form a reflector. The two or more mirror layers 54 and 56 may be any type of mirror layers that provide reflectivity at or near a desired wavelength spectrum. In a preferred embodiment, the mirror layers 54 and 55 are Silicon and Silicon Oxide, respectively, but may be any high or low index films, preferably with low infrared absorption. Other material systems may also be used, as desired. While only two mirror layers are shown in FIG. 2, more layers may be provided for increased wavelength discrimination. The top mirror 20 and the bottom mirror 22 preferably collectively form a Fabry-Perot cavity structure.

One or more layers may be situated between the top mirror 20 and the bottom mirror 22. In the illustrative embodiment, intervening layer 60 is provided between the top mirror 20 and the bottom mirror 22. Intervening layer 60 preferably has a refractive index that changes with temperature. In a preferred embodiment, layer 60 is silicon. By heating the silicon layer 60, the refractive index of the silicon layer 60 changes. This changes the resonant wavelength of the Fabry-Perot cavity structure, causing the transmission wavelength of the filter region to change. Using such a system, high wavelength resolution can be achieved, such as 0.2 nm, which is highly desirable in many applications including Dense-Wavelength-Division Multiplexing (DWDM) applications.

It is contemplated that the silicon layer 60 may be heated in any suitable manner. In the illustrative embodiment shown in FIG. 2, the silicon layer 60 is heated via a resistive layer 24, which is thermally coupled to the silicon layer 60. In the illustrative embodiment, resistive layer 24 is provided between the top mirror 20 and the silicon layer 60. The resistive layer 24 is preferably Vanadium Oxide, Platinum or some other resistive material. The resistive layer 24 is heated by passing current therethrough. The heat is transferred from the resistive layer 24 to the silicon layer 60, which changes the resonant wavelength of the Fabry-Perot cavity structure as described above. Rather than providing a separate resistive layer 24 as shown, it is contemplated that a current may be applied through the silicon layer 60 itself, if desired. In this case, the silicon layer 60 may be suitable doped to provide the desired resistivity.

Figure 5:
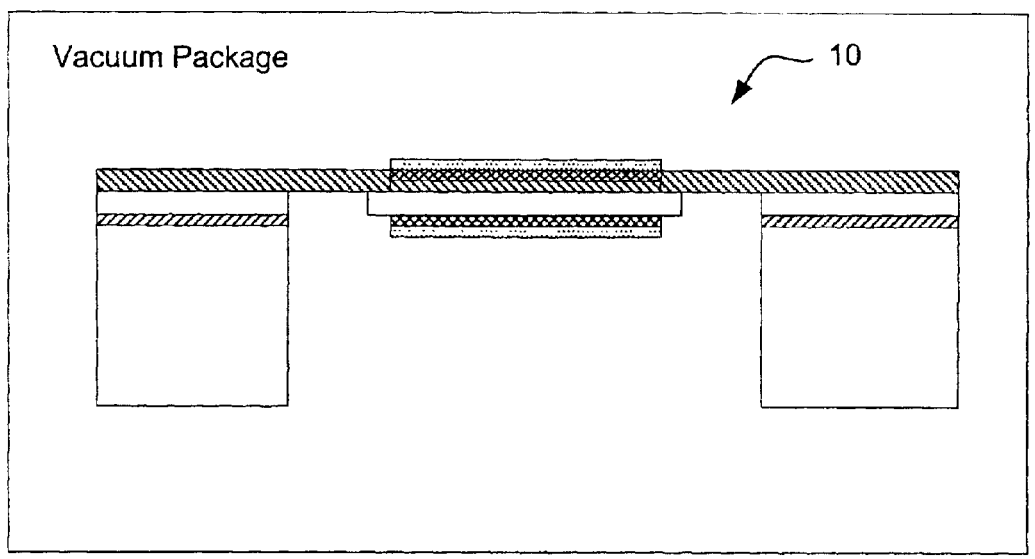
FIG. 5 is a schematic diagram showing the tunable optical filter of FIG. 1 positioned inside of a vacuum package.

To reduce the power required to drive the filter, the filter region 12 is preferably thermally isolated from the support body 14. In a preferred embodiment, this is accomplished by suspending the filter region 12 from the body region 14 using one or more support legs, such as support legs 16a and 16c. The support legs 16a–16d are preferably made from a material with a low coefficient of thermally conductivity, such as Silicon Nitride. The support legs 16a–16d may also be patterned to have a relatively small lateral cross sectional area, to further reduce the thermal conductivity between the filter region 12 and the support base 14. It is contemplated that the entire device may be mounted in a vacuum package to further reduce the thermal loss due to convection and conduction heating, as shown in schematic form in FIG. 5.

Figure 3A:
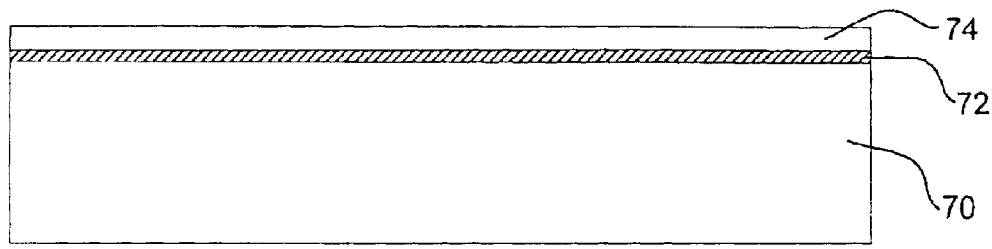
FIGS. 3A–3H are cross-sectional side views showing an illustrative method for forming the tunable optical filter of FIG. 1 and FIG. 2.

A number of methods are contemplated for making a tunable filter in accordance with the present invention. FIGS. 3A–3H are cross-sectional side views showing one illustrative method for forming a tunable optical filter of FIG. 1 and FIG. 2. In this illustrative method, a Silicon-On-Insulator (SOI) wafer is the starting point, as shown in FIG. 3A. The SOI wafer preferably has a lower silicon substrate layer 70, an intermediate insulating layer 72, and an upper silicon layer 74. The upper silicon layer 74 is preferably about 20 um thick.

Figure 3B:
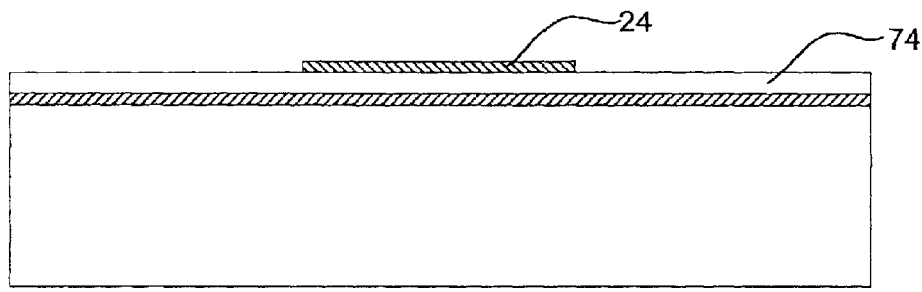
Figure 3C:
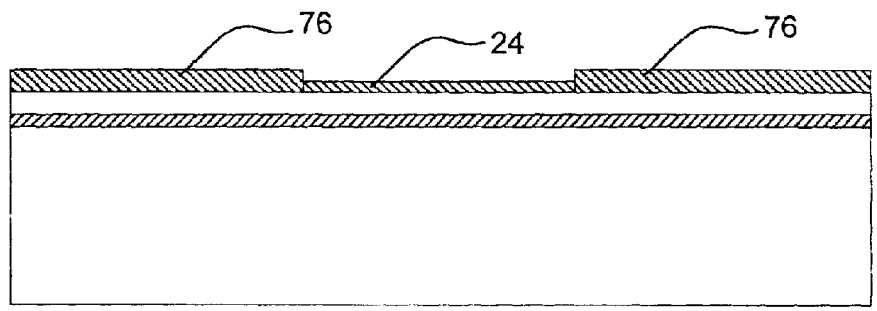
Figure 3D:
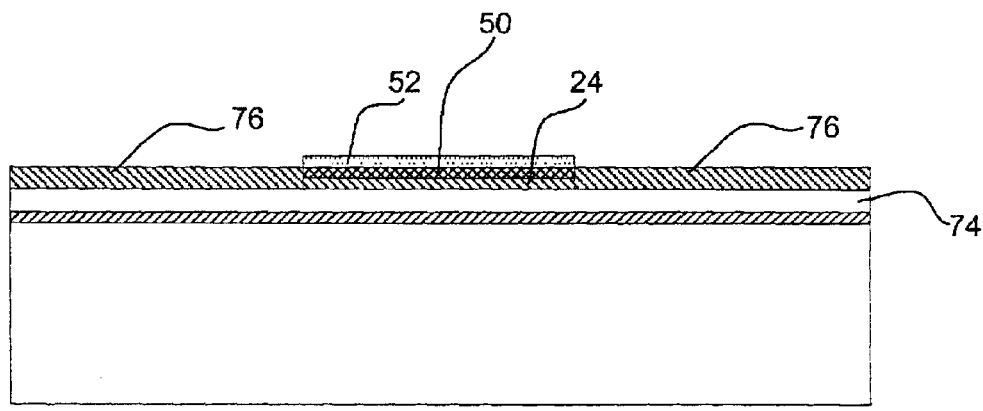

Next, and as shown in FIG. 3B, a resistive film 24 is provided over the top of upper silicon layer 74 as shown, and subsequently patterned. Next, and as shown in FIG. 3C, a support layer 76 is applied and patterned so as to not cover at least the center of the filter region 12. The support layer 76 is preferably patterned to form the support legs 16a–16d of FIGS. 1–2. Next, and as shown in FIG. 3D, alternating layers of Silicon 50 and Silicon Dioxide 52 are deposited and patterned over the resistive layer 24 in the filter region 12, as shown. The alternating layers of Silicon 50 and Silicon Dioxide 52 form the top multi-layer mirror 20.

Figure 3E:
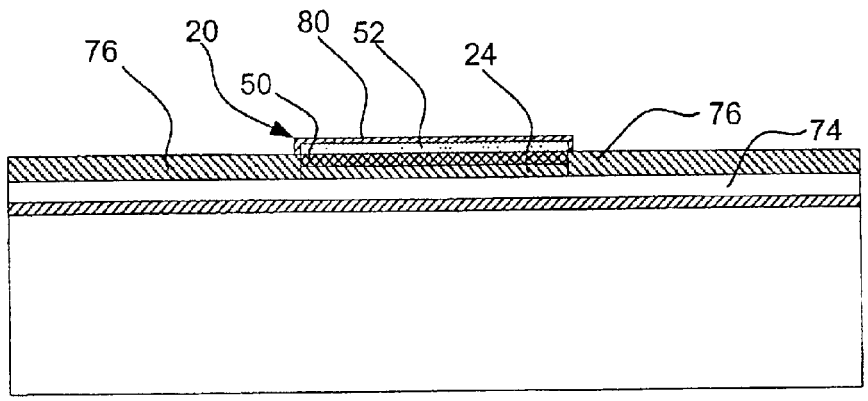
Figure 3F:
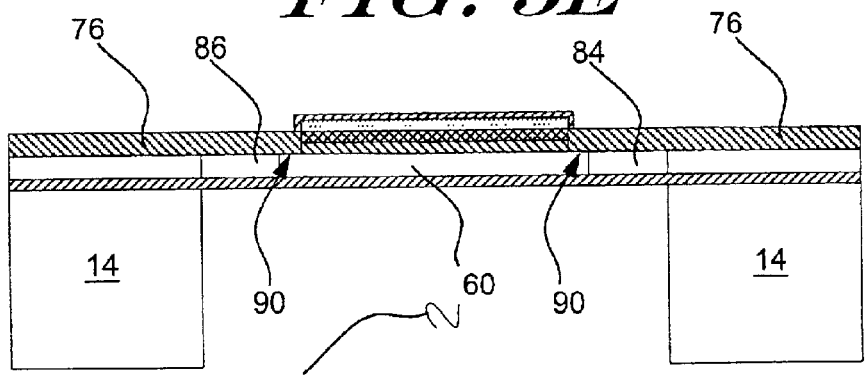

Next, a protective layer 80 is provided over the top multi-layer mirror 20, as shown in FIG. 3E. Thereafter, and as shown in FIG. 3F, the filter region 12 is released by etching the wafer using a KOH, EDP or some other suitable selective etch. This etch step removes the lower silicon substrate layer 70 up to the intermediate insulating layer 72, leaving a cavity 82 in the SOI wafer. The insulating layer 72 may act as an etch stop in some embodiments. The etch may also remove the upper silicon layer 74 around the filter region 12, as shown at 84 and 86. The remaining portion of the upper silicon layer 70 in the filter region 12 corresponds to the silicon layer 60 shown in FIG. 2. Preferably, the silicon layer 60 overlaps the support layer 76, and is bonded thereto along interface 90.

Figure 3G:
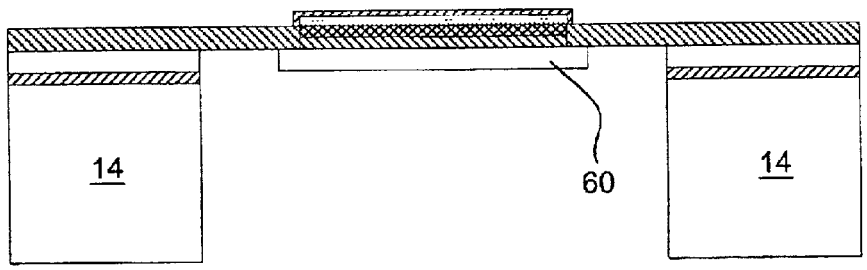
Figure 3H:
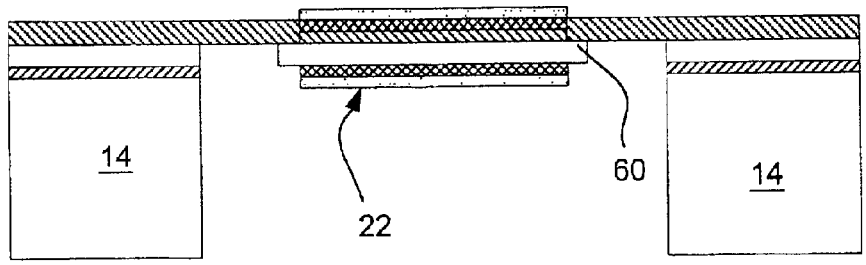

Next, and as shown in FIG. 3G, the intermediate insulating layer 72 is removed using another etch step. In some embodiments, the intermediate insulating layer 72 is not removed to provide additional support between the support body 14 and the filter region 12. Next, and as shown in FIG. 3H, alternating layers of Silicon 54 and Silicon Dioxide 56 are deposited and patterned on the back side of the silicon layer 60, as shown. These layers form the bottom multi-layer mirror 22.

Figure 4A:
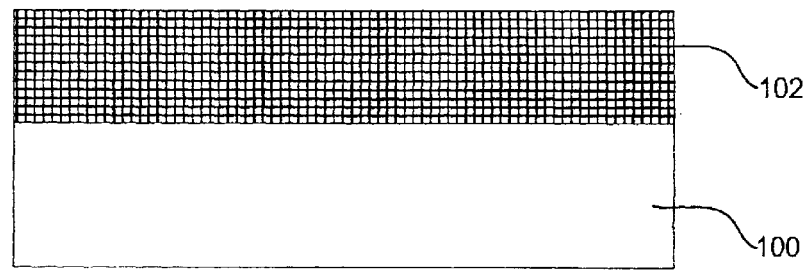
FIGS. 4A–4F are cross-sectional side views showing another illustrative method for forming a tunable optical filter in accordance with the present invention.
Figure 4B:
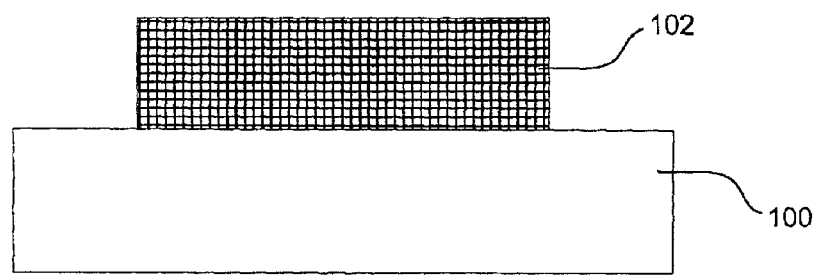
Figure 4C:
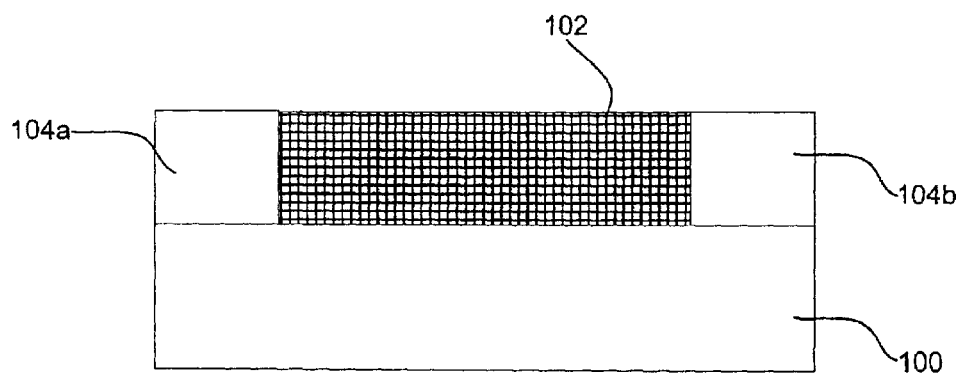
Figure 4D:
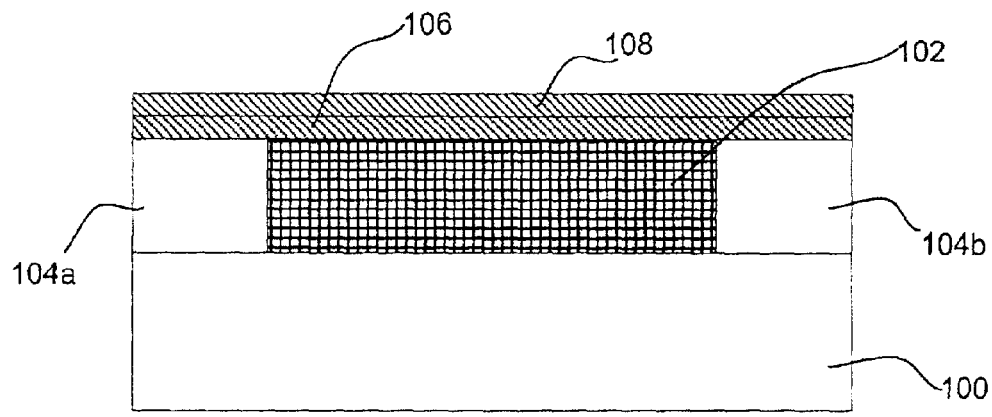
Figure 4E:
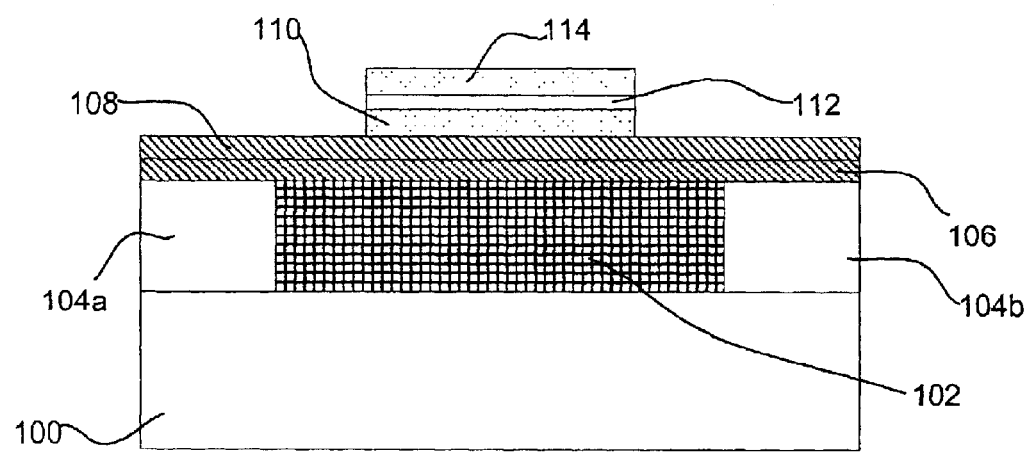

FIGS. 4A–4F show yet another illustrative method for making a tunable optical filter in accordance with the present invention. In this embodiment, a substrate 100 is provided. A sacrificial layer 102 is then provided over the substrate 100, as shown in FIG. 4A. Next, and as shown in FIG. 4B, the sacrificial layer 102 is patterned to define an eventual cavity. Next, and as shown in FIG. 4C, support members 104a and 104b are formed. Next, and as shown in FIG. 4D, a support layer 106 is applied and patterned, followed by a resistive layer 108. Like above, the support layer 106 is preferably patterned to form support legs, like support legs 16a–16d of FIGS. 1–2. Next, and as shown in FIG. 4E, alternating layers of Silicon and Silicon Dioxide, generally shown at 110, are deposited and patterned over the resistive layer 24 in the filter region 12, as shown. The alternating layers of Silicon and Silicon Dioxide 110 form a bottom multi-layer mirror.

Figure 4F:
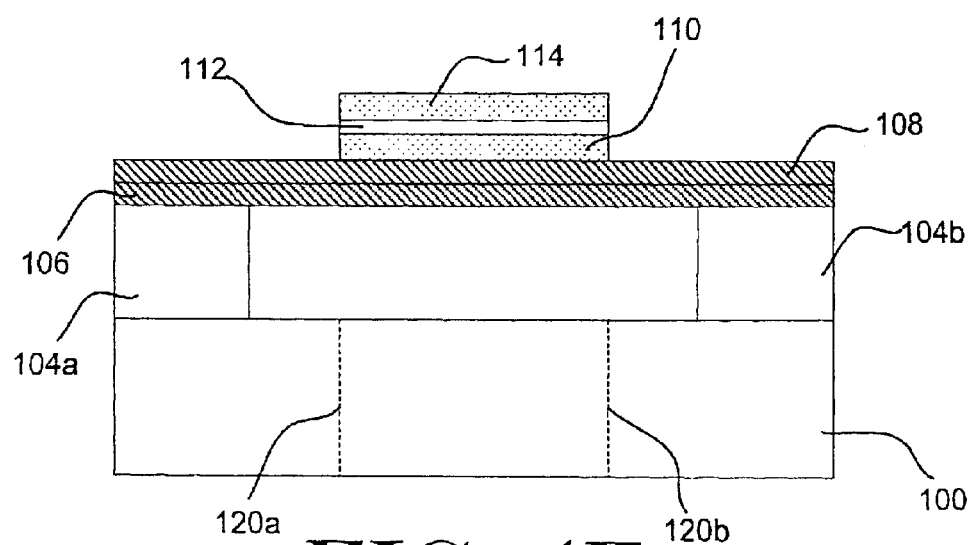

Next, a silicon layer 112 is provided over the alternating layers of Silicon and Silicon Dioxide 110, and subsequently patterned. Finally, alternating layers of Silicon and Silicon Dioxide, generally shown at 114, are deposited and patterned over the silicon layer 112. The alternating layers of Silicon and Silicon Dioxide 112 form a top multi-layer mirror. As can be seen, in this illustrative embodiment, the silicon layer 112 is heated indirectly from the resistive layer 108 through the alternating layers of Silicon and Silicon Dioxide 110. Next, and as shown in FIG. 4F, the sacrificial layer 102 is removed to release the structure. Finally, a hole may be cut through the substrate 100, as shown by dotted lines 120a and 120b, if desired.

While FIGS. 3A–3H and 4A–4F show two illustrative methods for making a tunable optical filter in accordance with the present invention, numerous other methods are contemplated. For example, rather than using a sacrificial layer to release the filter region, as described above, it is contemplated that the filter region may be released by etching a cavity or pit beneath the filter region into a supporting substrate. This may be accomplished in any number of ways, including for example, using an anisotropic etch.

Figure 6:
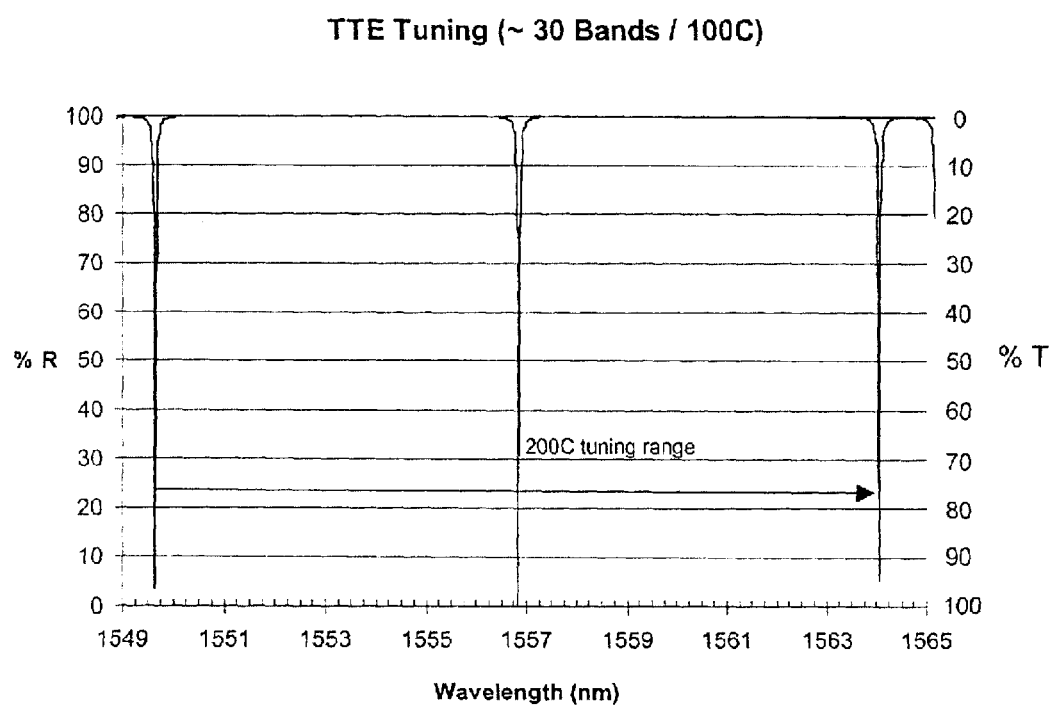
FIG. 6 is a graph showing the reflectance of the tunable filter of FIGS. 1–2 versus wavelength for three different temperatures of the filter region.

FIG. 6 is a graph showing the reflectance of the tunable filter of FIGS. 1–2 versus wavelength for three different temperatures of the filter region. The transmission, or one minus the reflectance, is shown along the right of the graph. As noted above, the intervening layer that is positioned between the top mirror and bottom mirror of the Fabry-Perot cavity structure has a refractive index that changes with temperature. By heating this layer, the refractive index changes, which changes the resonant wavelength of the Fabry-Perot cavity structure. In the illustrative embodiment, this causes the transmission wavelength of the filter region to change. As shown in FIG. 6, at 0° C., the transmission of the Fabry-Perot cavity structure rises to near 100% at a wavelength of about 1549.5 nm. At 100° C., the transmission of the Fabry-Perot cavity structure rises to near 100% at a wavelength of about 1557 nm. Finally, at 200° C., the transmission of the Fabry-Perot cavity structure rises to near 100% at a wavelength of about 1564 nm. As can readily be seen, this results in about 30 bands per 100° C., assuming the band are about 0.2 nm which is typical for Dense-Wavelength-Division Multiplexing (DWDM) applications.

Figure 7:
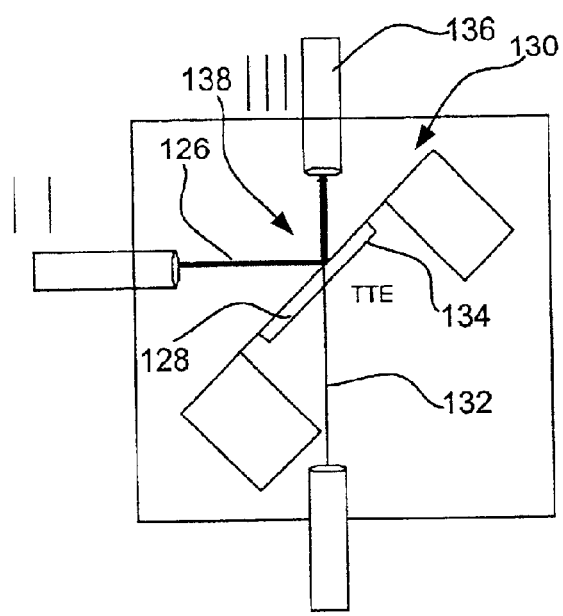
FIG. 7 is a schematic diagram showing an illustrative method for using a tunable filter of the present invention to add a selected wavelength signal or "channel" to a multiple channel data stream.

The tunable filter of the present invention has a wide range of applications, including, for example, telecommunications applications such as WDM, DWDM, WDD, and routing applications. In one example, the tunable filter of the present invention may be used in a signal add application where a particular wavelength signal or "channel" is added to a multiple channel data stream. FIG. 7 shows such an application. In the illustrative embodiment, a multiple channel data stream 126 is provided to a first side 128 of the tunable filter 130. The signal or channel to be added, which is generally shown at 132, is provided to the opposite side 134 of the tunable filter 130. The tunable filter 130, or more specifically the intervening layer between the top and bottom mirrors, is heated such that the tunable filter passes the signal or channel 132 to be added to a first collector location 136. The tunable filter also reflects the multiple channel data stream 126 to the first collector location 136, as shown at 138.

To add another signal or channel, a second tunable filter (not shown) may be provided at the first collector location 136. The signals or channels that are present at the first collector location 136, which in the illustrative embodiment include the multiple channel data stream 126 and the signal or channel 132, are provided to a first side of the second tunable filter. Another signal or channel to be added may be provided to the opposite side of the second tunable filter, similar to that described above. The second tunable filter is then heated such that the tunable filter passes the second signal or channel to be added to a second collector location. The second tunable filter also preferably reflects the signals provided by the first tunable filter 130 to the second collector location. This may continue, adding as many signals or channels to the multiple channel data stream as desired.

Figure 8:
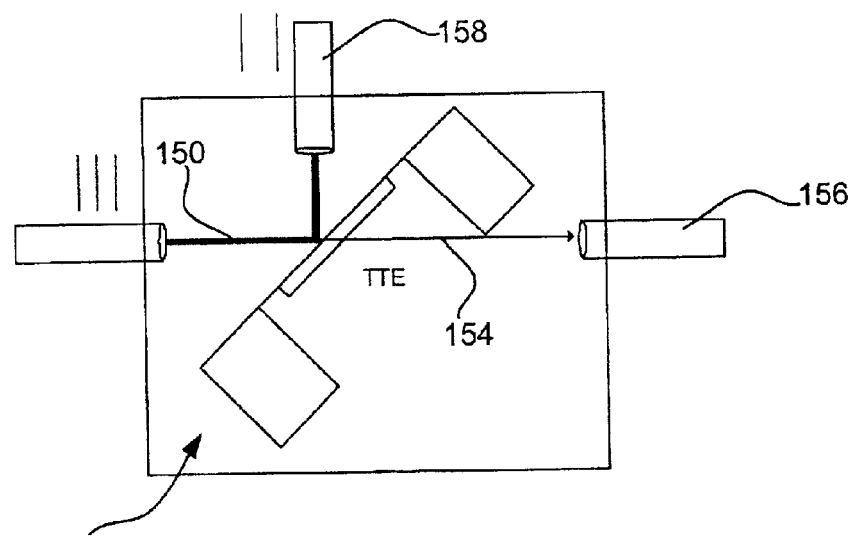
FIG. 8 is a schematic diagram showing an illustrative method for using a tunable filter of the present invention to drop a selected wavelength signal or "channel" from a multiple channel data stream.

FIG. 8 is a schematic diagram showing an illustrative method for using the tunable filter of the present invention to drop a selected wavelength signal or "channel" from a multiple channel data stream. In the illustrative embodiment, a multiple channel data stream 150 is provided to a tunable filter 152. The tunable filter 152 is heated such that the tunable filter 152 passes a desired drop signal or channel 154 to a first collector location 156, and reflects the remaining signals or channels to a second collector location 158.

Figure 9:
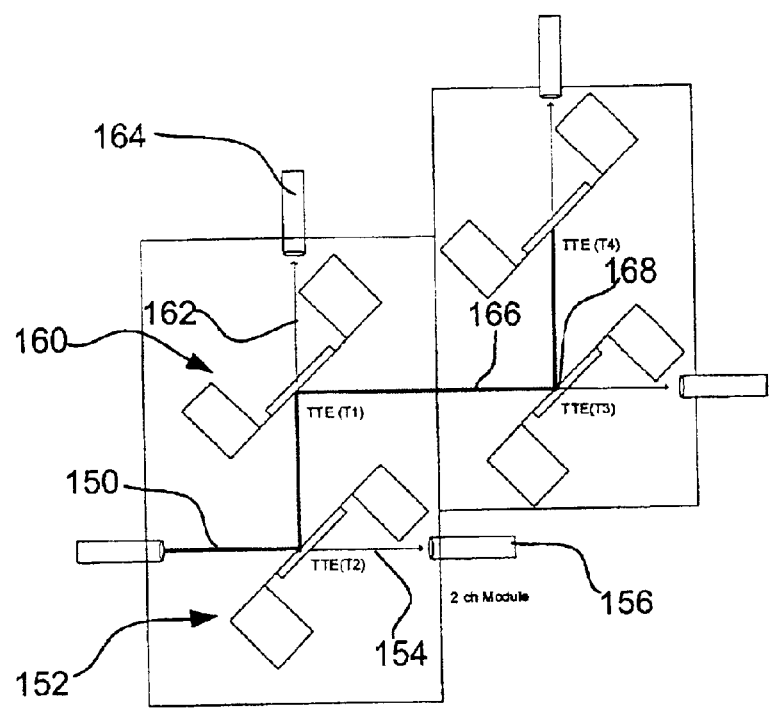
FIG. 9 is a schematic diagram showing an illustrative method for using several tunable filters of the present invention to drop several selected signals or "channels" from a multiple channel data stream.

To drop another signal or channel, and referring now to FIG. 9, a second tunable filter 160 may be provided at the second collector location 158. Like above, the second tunable filter 160 may be heated such that the tunable filter 160 passes another desired drop signal or channel 162 to a third collector location 164. The second tunable filter 160 may reflect the remaining signals or channels 166 to a fourth collector location 168. This may continue, dropping as many of the signals or channels from the multiple channel data stream 150 as desired.

Figure 10:
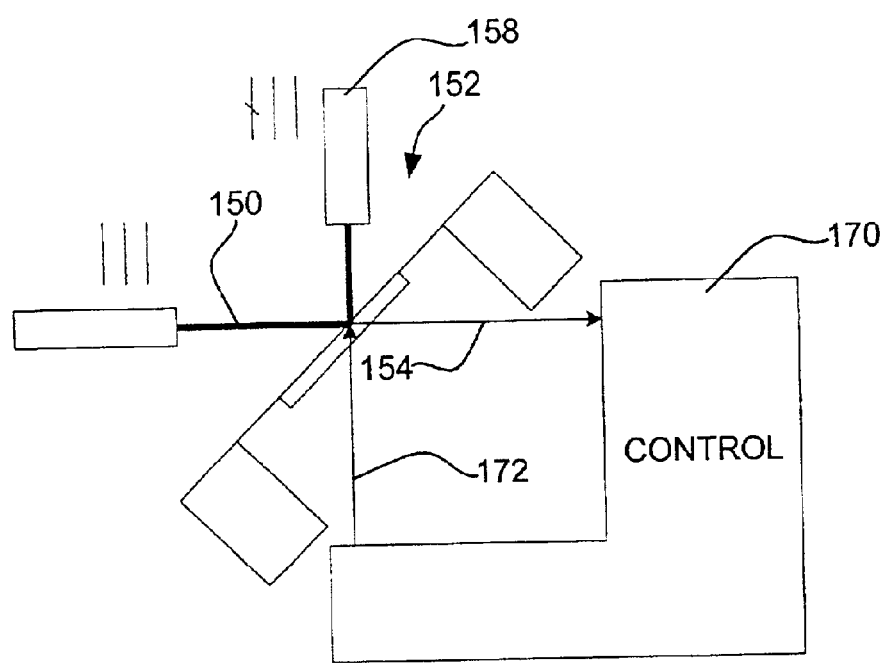
FIG. 10 is a schematic diagram showing an illustrative method for using the tunable filter of the present invention to drop a selected wavelength signal or "channel" from a multiple channel data stream, modify the dropped signal or channel, and add the modified signal or channel back into the multiple channel data stream.

FIG. 10 shows another illustrative application for the tunable filter of the present invention. In this embodiment, a selected wavelength signal or "channel" is dropped from a multiple channel data stream, modified, and then added back into the multiple channel data stream. In the illustrative embodiment, the multiple channel data stream 150 is provided to a tunable filter 152. The tunable filter 152 is heated such that the tunable filter 152 passes a desired drop signal or channel 154 to a controller 170, and reflects the remaining signals or channels to the second collector location 158. The controller 170 modifies the dropped signal or channel 154, and provides a modified signal or channel 172 back to the tunable filter 152 as shown. The controller 170 may, for example, amplify, delay or otherwise change the dropped signal or channel 154 to provide the modified signal or channel 172. The modified signal or channel 172 then travels through the tunable filter 152 and is received at the second collector location 158.

Figure 11:
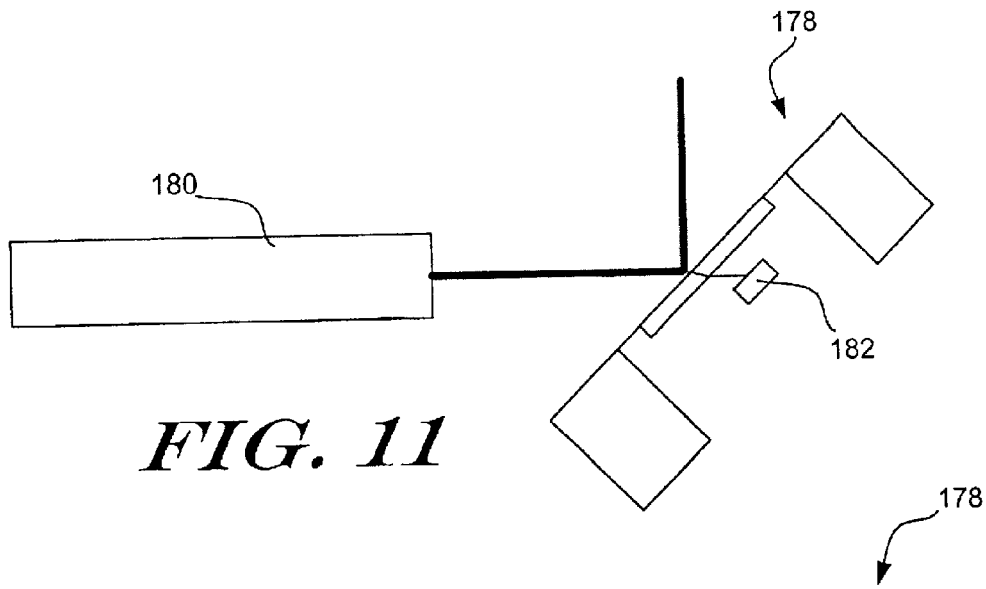
FIG. 11 is a schematic diagram showing an illustrative method for monitoring the emission wavelength of a light source such as a laser.

Another illustrative application for the tunable filter of the present invention is to monitor the emission wavelength of a laser or other light source. It is known that the emission wavelength of a laser may drift over time, temperature, etc. To monitor the emission wavelength, a tunable filter 178 of the present invention may be positioned between a laser 180 and a detector 182, as shown in FIG. 11. The detector 182 preferably is capable of detecting a relatively wide range of wavelengths, while the tunable filter 178 only passes a relatively narrow band of wavelengths, such as shown in FIG. 6. With the laser 180 turned on, the tunable filter 178 is heated until the filter passes the operating wavelength of the laser 180 to the detector 182. When the detector detects the emission of the laser, a controller (not shown) is notified. By noting the heat and/or power that was applied to the tunable filter, the controller may determine the operating wavelength of the laser 180.

Figure 12:
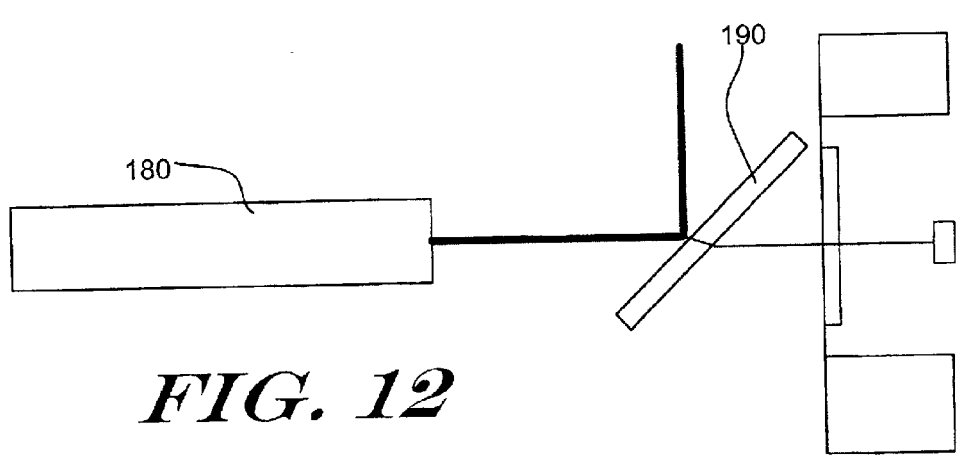
FIG. 12 is a schematic diagram showing another illustrative method for monitoring the emission wavelength of a light source such as a laser.
Figure 13:
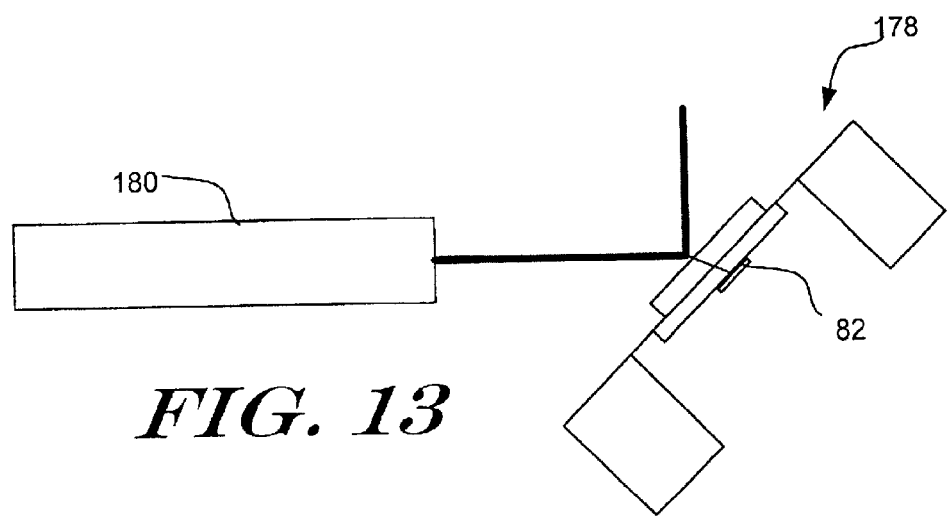
FIG. 13 is a schematic diagram showing yet another illustrative method for monitoring the emission wavelength of a light source such as a laser.

Such a system may be used to, for example, control the wavelength of a laser. For example, if the operating wavelength of the laser 180, as determined by the controller, is not within a predefined range of wavelengths, the controller may adjust the power that is applied to the laser 180 to change the emission wavelength of the laser until it falls within the predefined range of wavelengths. It is contemplated that the laser emission may be directly applied to the tunable filter 178. Alternatively, and as shown in FIG. 12, only a portion of the laser emission may be applied to the tunable filter 178 by using a beam splitter 190 or the like. Finally, it is contemplated that the detector 182 may be mounted on the tunable filter 178, as shown in FIG. 13.

Having thus described the preferred embodiments of the present invention, those of skill in the art will readily appreciate that the teachings found herein may be applied to yet other embodiments within the scope of the claims hereto attached.

What is claimed is:

1. An apparatus comprising a tunable filter for passing one or more selected wavelength from a band of wavelengths, the tunable filter adapted to be tuned to the one or more selected wavelength without physically moving any parts of the tunable filter, the tunable filter reflecting unselected wavelengths; wherein the tunable filter has a filter region, a support body and one or more support legs, the filter region formed of first and second mirrors with a layer between them that has a refractive index that changes with temperature, and wherein the one or more support legs are adapted to suspend the filter region away from the support body.

2. A tunable filter for selecting a desired wavelength from a band of wavelengths, comprising:
    a support structure having one or more support members;
    a first mirror;
    a second mirror;
    a layer situated between the first mirror and the second mirror, the layer having a refractive index that changes with temperature, the refractive index at least partially determining the wavelength that is selected by the tunable filter; and
    heating means for providing heat to the layer;
    wherein the layer is mechanically supported by the support members, and the layer is spaced from the support structure by the support members.

3. A tunable filter according to claim 2 wherein the layer is suspended in a cavity.

4. A tunable filter according to claim 3 wherein the cavity is at a lower pressure than outside of the cavity.

5. A tunable filter according to claim 4 wherein the cavity is under a substantial vacuum.

6. A tunable filter according to claim 5 wherein the tunable filter is enclosed in a vacuum package.

7. A tunable filter according to claim 2 wherein the layer is spaced from the support structure by air gape.

8. A tunable filter according to claim 2 wherein the one or more support members are part of a patterned support layer that is connected to the layer and the support structure.

9. A tunable filter according to claim 8 wherein the layer is silicon.

10. A tunable filter according to claim 9 wherein the patterned support layer is Silicon Nitride.

11. A tunable filter according to claim 9 wherein the patterned support layer is polyimide.

12. A tunable filter according to claim 9 wherein the patterned support layer is silicon.

13. A tunable filter according to claim 9 wherein the patterned support layer is polycrystalline silicon.

14. A tunable filter according to claim 2 wherein the heating means includes a resistive layer that is thermally connected to the layer.

15. A tunable filter according to claim 14 wherein the resistive layer includes vanadium.

16. A tunable filter according to claim 14 wherein the resistive layer includes platinum.

17. A tunable filter according to claim 14 wherein the resistive layer includes polycrystalline silicon.

18. A tunable filter according to claim 2 wherein the heating means includes two or more electrical contacts that provide a current path through the layer.

19. A tunable filter according to claim 2 further comprising a controller for providing a controlled current to the heating means.

20. A tunable filter according to claim 19 further comprising a temperature sensor thermally coupled to the layer, the temperature sensor providing an output signal indicative of the temperature of the layer.

21. A tunable filter according to claim 20 wherein the controller receives the output signal of the temperature sensor, and provides a controlled current to the heating means to maintain the temperature of the layer at a desired temperature.

22. A tunable filter according to claim 19 wherein the heating means includes a material that has a resistance with a temperature coefficient.

23. A tunable filter according to claim 22 wherein the controller determines the temperature of the heating means by monitoring the resistance of the heater means.

24. A method for tuning a tunable filter, the method comprising tuning the tunable filter of claim 2 to one or more selected wavelength from a band of wavelengths without physically moving any parts of the tunable filter;

passing the one or more selected wavelengths through the tunable filter; and reflecting unselected wavelengths.

25. An apparatus for selecting a desired wavelength from a band of wavelengths, comprising:

a tunable filter for passing a selected wavelength, the tunable filter being tuned to a selected wavelength by applying heat to the tunable filter, the tunable filter having a filter region spaced from a support body by air gaps;

heating means for providing heat to the tunable filter; and a controller for applying a controlled power to the heating means such that the desired wavelength is selected by the tunable filter.

* * * * *